Dec. 22, 1931.  G. W. SWIFT, JR  1,837,841
MACHINE FOR MAKING COMPOSITE BOARDS
Filed March 17, 1931  3 Sheets-Sheet 1
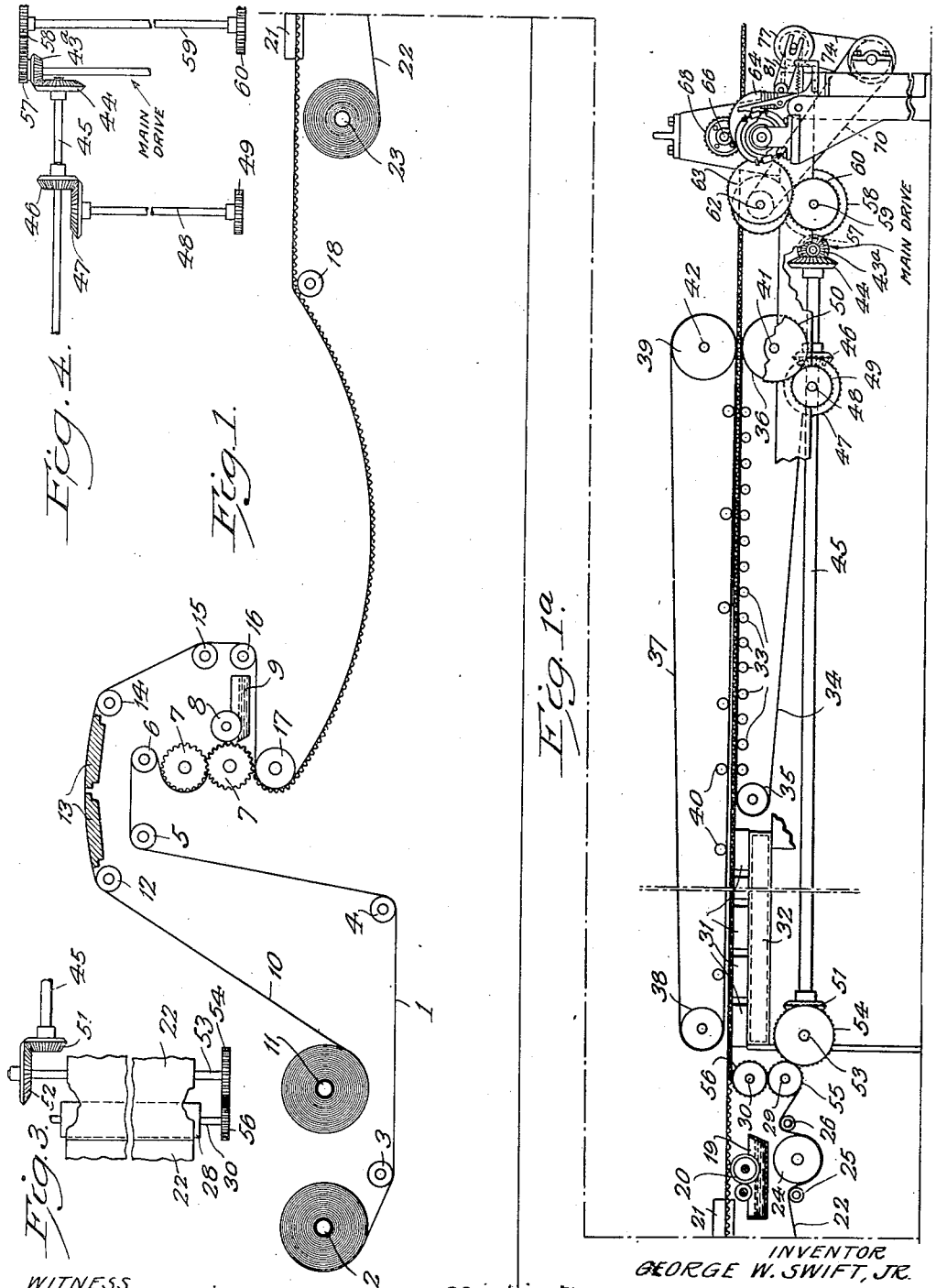
INVENTOR
GEORGE W. SWIFT, JR.
By his Attorneys
Knight Bros.

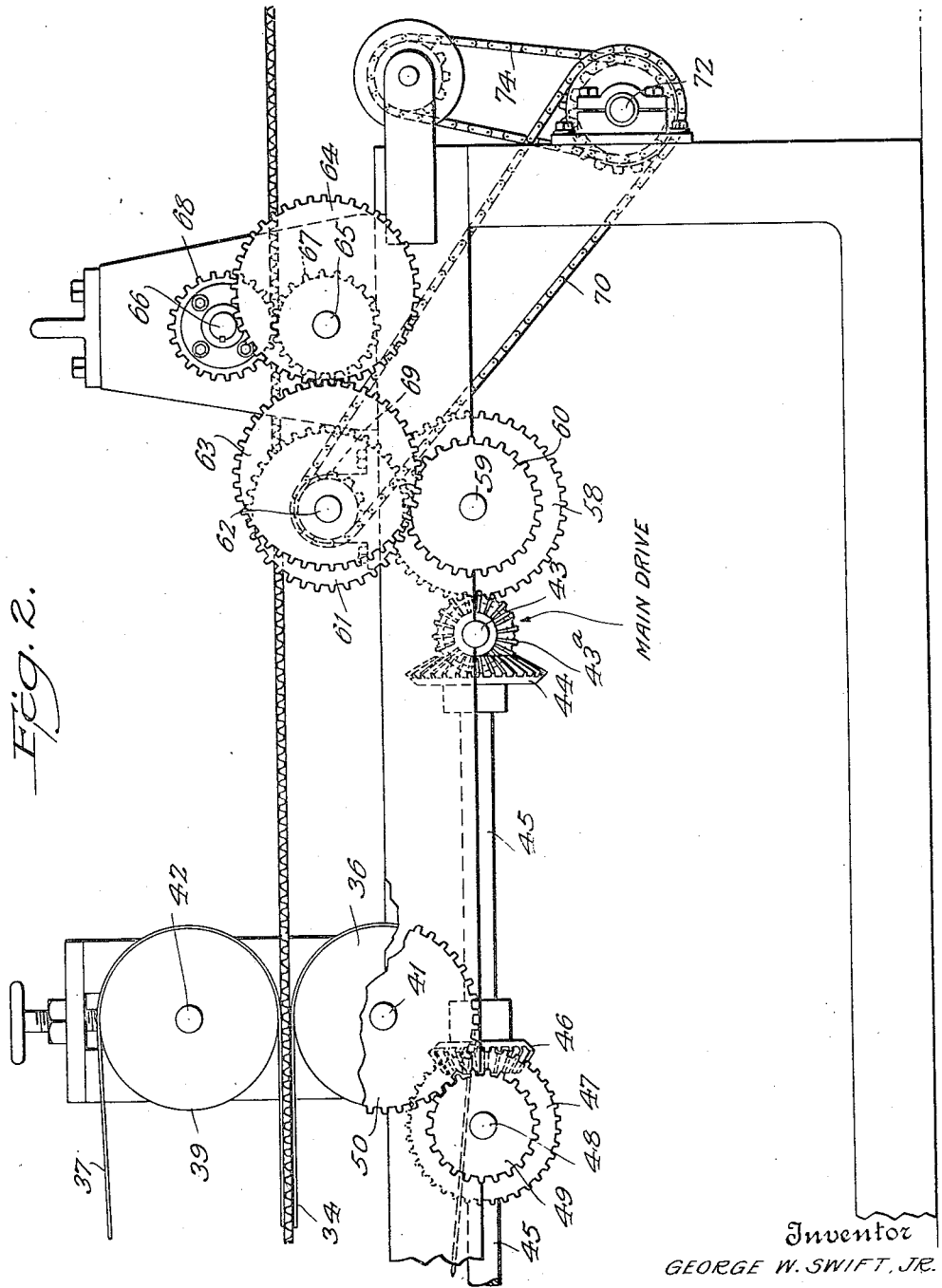

Dec. 22, 1931.   G. W. SWIFT, JR   1,837,841
MACHINE FOR MAKING COMPOSITE BOARDS
Filed March 17, 1931   3 Sheets-Sheet 3

Inventor
GEORGE W. SWIFT, JR.
By his Attorneys
Knight Bros.

Patented Dec. 22, 1931

1,837,841

UNITED STATES PATENT OFFICE

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY

MACHINE FOR MAKING COMPOSITE BOARDS

Application filed March 17, 1931. Serial No. 523,244.

This invention relates more especially to machines for making and cutting composite or multi-web boards such, for example, as that shown and described in U. S. Patent No. 1,492,490, which granted in my name under date of April 29, 1924.

According to U. S. Patent No. 1,492,490, both facing sheets of a double-faced corrugated board are substantially simultaneously applied to the oppositely-presented crowns of a corrugated web around the periphery of a main applying roll 20 which in effect serves as a measuring roll for cutting off successive lengths from the completed web of double-faced corrugated board. As shown diagrammatically in Figure 3 of the drawings in this patent, the main applying or measuring roll 20, cutter blades 107 and feed rolls 105, are driven at constant speed ratios with respect to each other by positively geared connections with a common power source. With this assembly and relative arrangement of parts, a slight over-feed of the feed rolls 105 serves to draw the double-faced cellular paper board taut in a straight path extending between and from the applying rolls 20 and 21 to the feed rolls 105. Under these conditions, the successive lengths of double-faced corrugated board fed to the cutters 107 revolving at periodic intervals, will depend upon the measured speed of the applying rolls 20 and 21. The practical results obtained by this mechanism have not been entirely satisfactory for the reason that it is difficult to equalize the strain and relative lengths of the facing webs. Furthermore, any inequality of strain in the several webs while they are in process of being united and before the adhesive is completely dried, is liable to impart a tendency in the finished composite board to curl and warp.

According to my present invention, these drawbacks are practically eliminated.

One of the objects of my invention is to provide an improved combination and arrangement of parts in a machine of this character by means of which, for example, oppositely-arranged liner webs may be applied to the opposite faces of a corrugated web without producing unequalized strains between the webs comprising the finished composite board and thus facilitating the production of flat stiff board with a minimum tendency to curl or warp. For this purpose, my invention contemplates the applying of the liner webs to opposite faces of the corrugated web in different successive stages prior to the heating stage and the feed of the finished composite board to periodically operated cutters under the measured feed and constraint of only one of the webs prior to its union with the others. Preferably, I employ the bottom liner or last-applied web for measuring successive lengths of the completed double-faced board to be fed to the cutters so that most of the feeding tension is developed in this single liner web. It will be understood, however, that by slight modifications of structure within the spirit of my present invention, the single-faced corrugated board may be employed for measuring the successive lengths of the completed double-faced board to be fed to the cutting mechanism while the bottom liner sheet is supplied thereto under a resistance due to its weight and inertia. As shown the single-faced corrugated board is fed forward under a resistance due solely to the weight and inertia of a loosely suspended portion of the single faced corrugated web which depends between the mechanism for applying the first liner web and the adhesive fountain for applying adhesive to the crowns on the opposite face of said single liner web preparatory to the application of the second liner web thereto.

In the particular embodiment of my invention shown on the drawings, the single-faced corrugated board is produced in a separately driven machine and fed under low tension to the second silicated fountain which applies adhesive to the single-faced corrugated board as it approaches the position for applying the bottom liner web thereto. As hereinafter explained, the feed rolls for supplying the lower liner web from stock, are driven by means of operating connections with a power shaft which drives the upper and lower friction feed belts for feeding the finishing double-faced corrugated board to the cutting mechanism. By means of this construction, the desired length of the completed double-faced board is fed to the periodically-operated cutter blades in timed relation with the accurately measured feed of the lower liner web before it has become a part of the double-faced board. A desirable uniformity in the lengths of successive cut-off portions may thus be more simply and effectively secured.

A preferred embodiment of my invention is shown on the drawings.

Figures 1 and 1a together constitute a diagrammatic side elevation of an entire machine for making double-faced corrugated board and cutting it into predetermined lengths.

Figure 2 is an enlarged side elevation of the feeding and cutting mechanism for the completed double-faced board.

Figure 3 is a fragmentary top plan view of the feeding and measuring mechanism for the bottom liner web, parts being broken away.

Figure 4 is a top plan view of the power connections for driving the main feed belts and periodic cutting mechanism for the completed double-faced board, parts being broken away.

Figure 5:
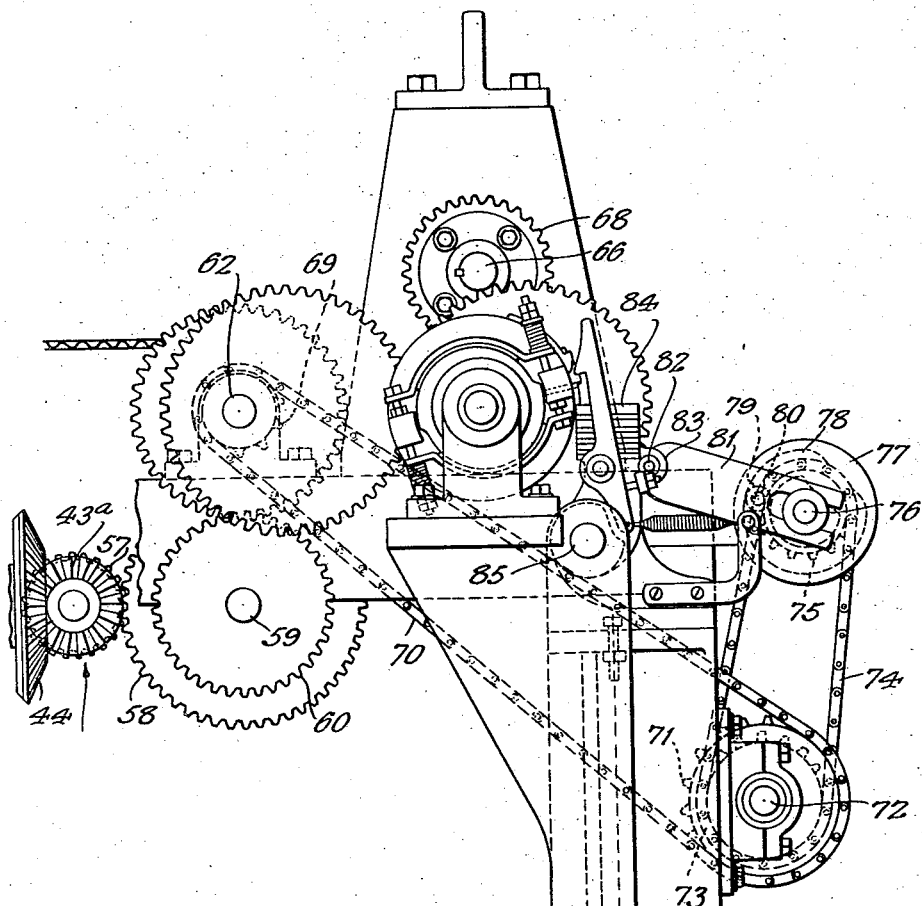
Figure 5 is an enlarged side elevation of the power connections for the cutting mechanism.
Figure 6:
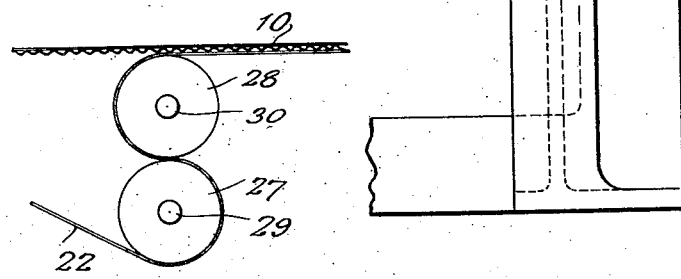
Figure 6 is an enlarged vertical section of the measuring and feed rolls for the bottom liner web.

Referring more especially to Figures 1 and 1a, a web 1 is drawn from a roll mounted upon an arbor 2, said web being passed around guide rollers 3, 4, 5 and 6 to the corrugating rolls 7 by means of which said web is corrugated. As the corrugated web passes around the lower corrugating roll 7, the crowns of the corrugations in said web are brought into contact with a fountain roll 8 which has its periphery operating in a silicate bath 9. A second web 10 is drawn from a roll carried by an arbor 11 and passed over a guide roll 12, ironing platens 13, a second guide roller 14, guide rollers 15 and 16, and around a pressure roll 17 by means of which the liner web 10 is pressed against the silicated tips of the corrugated web 1 as said webs are passed together between the lower corrugating roll 7 and the smooth liner-applying guide roll 17. This mechanism for forming the single-faced corrugated board may be driven by a separate motor or suitable power connections may be provided for driving said mechanism from the main drive shaft to be hereinafter referred to, the relative speeds of the several parts being such that a slack portion of the single-faced board is suspended between the pressure roll 17 and a guide roller 18 over which the single-faced corrugated board passes into position to have the lower liner web applied thereto. In consequence, the single-faced board will be drawn forwardly under a tension due solely to its own weight and inertia. A second silicate fountain 19 within which operates a fountain roll 20, is arranged in advance of a guide 21 in such a way as to apply the adhesive to the downwardly-presented crowns of the corrugated web as it passes forwardly into position to have the bottom liner web 22 applied thereto, said bottom liner web being drawn from a roll carried by an arbor 23. For this purpose, the bottom liner web 22 is drawn around a tensioning roller 24 interposed between guide rollers 25 and 26, said liner web being fed from the roll by means of cooperating feed rolls 27 and 28 around and between which said liner web passes into position to be applied to the downwardly-presented crowns of the single-faced corrugated board. The feed rolls 27 and 28 are mounted upon power-driven shafts 29 and 30, said power shafts being cooperatively driven by suitable power connections as hereinafter described for the purpose of measuring the rate of feed of the bottom liner web 22 and in predetermining the rate of such feed to correspond with the periodic timing of the cutter mechanism. As the double-faced corrugated board is moved forwardly, it travels over a series of drying plates 31 which are mounted above a steam chamber 32 for the purpose of drying the adhesive and permanently uniting the several webs together to form the finished composite board. Arranged in advance of the drying plates 31 is a series of supporting rollers 33 over which travel lower feed belts 34, said feed belts being carried by a rear drum 35 and a front drum 36. An upper feed belt 37 may be carried by a rear drum 38 and a forward drum 39, the lower run of said upper belt being weighted by pressure rolls 40. The feed drums 36 and 39 are mounted upon rotary shafts 41 and 42 respectively. Referring more especially to Figure 2, a main drive shaft 43 extends transversely across the machine and may receive its power from any suitable source. Keyed to the drive shaft 43 is a bevel pinion 43a which meshes with a bevel gear 44 keyed to a longitudinal power-transmitting shaft 45. A bevel pinion 46 which is also keyed to the power shaft 45, meshes with a spur gear 47 keyed to the far end of a transverse shaft 48. Keyed to the near end of said shaft 48 is a spur gear 49 which meshes with another spur gear 50, said spur gear 50 being keyed to the lower drum shaft 41. The drum shafts 41 and 42 are geared together to move in unison by suitable spur gears (not shown on the drawings). As shown in Figure 1a, the power-transmitting shaft 45 is extended rearwardly, a bevel pinion 51 being keyed thereto and arranged to mesh with a bevel gear 52 as shown in Figure 3. The bevel gear 52 is keyed to the far end of an intermediate power shaft 53. Keyed to the near end of the intermediate power shaft 53 is a spur gear 54 which meshes with a smaller spur gear 55, the last-mentioned spur gear being keyed to the lower feed roll shaft 29. A spur gear 56 which is keyed to the upper feed roll shaft 30, meshes with the spur gear 55 so that the feed rolls 27 and 28 are rotated in unison with each other and serve to measure the feed of the bottom liner web 22 in definite ratio with the speed of the main drive shaft 43.

Referring more especially to Figures 2, 4 and 5, the main drive shaft 43 carries at its farther end a spur pinion 57 which meshes into and drives a large spur gear 58 which is keyed to a cross shaft 59. Keyed to the nearer end of cross shaft 59 is a lower spur gear 60 which meshes into an upper spur gear 61 keyed to an upper cross shaft 62. Also keyed to the upper cross shaft 62 and adjacent to the spur gear 61, is an eccentric spur drive gear 63 which meshes with and drives an eccentric spur gear 64, the last-mentioned eccentric spur gear being freely journaled on a lower cutter shaft 65. According to the present embodiment of my invention, the eccentric spur gear 64 is adapted to transmit power to the lower cutter shaft 65 by means of clutch mechanisms such as that shown and described in my copending application Serial No. 433,259; filed March 5, 1930. An upper cutter shaft 66 is connected up to be driven in unison with the lower cutter shaft 65 by means of a spur gear 67 which is keyed to lower cutter shaft 65 and meshes with a spur gear 68 which is keyed to the upper cutter shaft 66. Said cutter shafts 65 and 66 normally remain at rest due to the fact that their driven connection with the eccentric spur gear 64 is interrupted by the clutch in its release position. In order to render the clutch active at periodic intervals under control of mechanism which operates at fixed time intervals, I preferably employ the clutch-controlling connections shown and described in my above-identified copending application, Serial No. 433,259, wherein a cam-operated stop or anvil is periodically moved into and out of position to intercept a protruding lug carried by a clutch-operating ring. As shown in Figures 2 and 5, the periodic release of the clutch is definitely timed with respect to the main driving shaft by means of the following operating connections. Keyed to the upper cross-shaft 62 is a sprocket wheel 69 which is connected by a sprocket chain 70 to a sprocket wheel 71 on a shaft 72. A second sprocket wheel 73 on the shaft 72 is connected by a sprocket chain 74 with another sprocket wheel 75 on a cam-shaft 76. Keyed to the cam-shaft 76 is a cam 77 which is provided with a cam-groove 78. Travelling in the cam-groove 78 is a cam-roller 70 which is journaled on a pin 80 which projects laterally from a link or plate 81, said link or plate being pivotally connected at its rear upper end to a stud 82 mounted in a lug 83 on a stop or anvil 84. Said stop or anvil 84 is movable about a pivot 85 into and out of position to intercept the clutch-controlling ring in the manner shown and described in my copending application identified above. It will be understood from this description that at periodic intervals, the clutch is released to permit an operation of the cutter-shafts from normal rest position.

The advantages secured by a machine which is constructed according to the principles of my invention may now be readily understood from the foregoing description of the preferred form of said invention illustrated on the accompanying drawings. Referring more especially to Figures 1 and 1a of the drawings, it will be seen that the feed of the completed double-faced corrugated board to the cutting blades, will take place under the combined drawback of the single-faced board formed by and between the rolls 7, 7, and 17, and the single bottom liner web 22 which is fed around and between the measuring feed rolls 27 and 28. It will be evident furthermore that the drawback or resistance to the forward movement of the single-faced corrugated board will be due substantially to the weight and inertia of the slack portion thereof which depends or is arranged between the pressure roll 17 and guide roller 18, the resulting tension therein being sufficient to maintain the single-faced board taut and in horizontal alinement with the drying table where it and the bottom liner sheet applied thereto, are held flat by the pressure applying belts until it is completely dried and hardened. The draw back tension in the bottom liner sheet 22, on the other hand will be due to the slight over-feed linear velocity of the feed rolls 36 and 39 with respect to the measuring feed rolls 27 and 28 and it is this tension which determines the linear velocity of the completed double-faced corrugated board as it passes to the cutter-blades. Finally, it is to be noted that inasmuch as the cutter-blades are operated periodically and in definitely timed relation to the periodic operations of the cutter-blades, the successive portions severed from the continuous web of composite board will be substantially equal and of a length depending upon the speed of measuring feed rolls 27 and 28.

I claim:—

1. In a machine of the character described, the combination with mechanism for assembling a plurality of webs and securing said webs together to form a composite board, of mechanism for cutting said composite board into lengths, means for measuring one of the webs before it is combined with the other webs to form the composite board and means for driving said cutting mechanism in definitely timed relation to said measuring means.

2. In a machine of the character described, the combination with mechanism operated at predetermined time intervals for cutting multi-web composite board into lengths, of mechanism for feeding said composite board to said cutting mechanism, and other mechanism operating at predetermined speed on one of the webs prior to its incorporation in said composite board for feeding and measuring said web, the single web feeding and measuring means being adapted to determine the travel of said composite board in the intervals between successive operations of said cutting mechanism.

3. In a machine of the character described, the combination with mechanism operated at predetermined time intervals for cutting multi-web composite board into lengths, of mechanism for feeding the finished composite board to said cutting mechanism, and feeding and measuring mechanism operating at predetermined speed on one of the component webs of said composite board, the last-mentioned mechanism being adapted to limit the supply of the single web for controlling the supply of finished composite board to the cutting mechanism.

4. In a machine of the character described, the combination with mechanism operated at predetermined time intervals for cutting multi-web composite board into lengths, of feeding and measuring mechanism operating at predetermined speed on a single web for restricting the supply of said web, other mechanism for feeding partly finished composite board from a slack supply and for feeding the finished composite board to said cutting mechanism, and means for applying said single strip to the partly finished composite board, the restricted feed of said single web being adapted to measure the supply of finished board to said cutting mechanism.

5. In a machine of the character described, the combination with mechanism for cutting composite boards into lengths, said cutting mechanism being provided with periodically operated knives, of mechanism for feeding and assembling the several webs comprising the composite board, said feeding and assembly mechanism including a measuring roll operating on one of said webs before it is united to the others, and positively-geared power connections common to said measuring roll and cutting mechanism.

6. In a machine of the character described, the combination with mechanism for cutting corrugated boards into lengths, of mechanism for feeding and measuring one of the webs comprising said corrugated board, a common power shaft positively geared to both of said mechanisms, and means driven by said common power shaft for controlling the periodicity of said cutting mechanism.

7. In a machine of the character described, the combination with mechanism for cutting corrugated boards into lengths, said cutting mechanism being provided with periodically operated knives, of mechanism for feeding a liner web into position to be applied to the partly-prepared corrugated board, said liner web feeding means including a measuring roll for measuring the liner web, a drive shaft for said cutting mechanism, and power-transmitting connections between said drive shaft and said measuring roll.

8. In a machine of the character described, the combination with periodically operated mechanism for cutting a composite board into lengths, of mechanism for feeding and measuring one of the webs independently of the others, and means operated in timed relation to said feeding and measuring mechanism for timing the operation of said cutting mechanism.

9. In a machine of the character described, the combination with periodically operated mechanism for cutting a composite board into lengths, of mechanism for feeding and uniting some of the webs, means for feeding and measuring another web, said feeding and measuring means being adapted to unite said other web to the others after the measuring operation, and means for timing the operations of said cutting mechanism with said feeding and measuring mechanism.

10. In a machine of the character described, the combination with mechanism for cutting a composite board into lengths, of mechanism for feeding, measuring and uniting two of the webs which are to be included in the composite board, other mechanism for separately feeding another web into position to be united with the two aforementioned webs, the last-mentioned feeding mechanism including a measuring roll in running engagement with said other web, and power connections common to said cutting mechanism and the last-mentioned feeding mechanism, said power connections being adapted to operate said cutting mechanism in definitely timed relation to said measuring roll.

11. In a machine of the character described, the combination with mechanism for cutting corrugated boards into lengths, said cutting mechanism being provided with periodically operated knives, of mechanism for feeding and assembling the webs comprising the corrugated board, said feeding and assembling mechanism including a measuring roll in separate running engagement with only one of said webs, and power connections for driving said cutting mechanism, said measuring roll being positively geared to said power connections to operate in definitely timed relations with respect thereto.

12. In a machine of the character described, the combination with mechanism for continuously forming corrugated boards comprising flat and corrugated webs, of periodically operated cutting mechanism for cutting said corrugated board into lengths, said corrugated board forming mechanism being provided with a measuring roll for independently measuring the feed of one of said webs, means for driving said cutting mechanism, and power-transmitting connections between said driving means and said measuring roll.

13. In a machine of the character described, the combination with mechanism for applying liner webs to opposite sides of a corrugated web, of periodically operated cutting mechanism for cutting the corrugated board into lengths, the mechanism for applying one of said liner webs including a measuring roll for measuring the linear feed of that liner web, and positively geared power-transmitting connections for coordinating said measuring roll with the operating periods of said cutting mechanism.

14. In a machine of the character described, the combination with mechanism for cutting corrugated boards into lengths, of mechanism for separately feeding liner webs into position to be applied to opposite sides of a corrugated web, the liner web feeding means for one of said liner webs including feed rolls adapted to measure the feed of that liner web, a drive shaft for said cutting mechanism, power-transmitting connections between said drive shaft and said measuring feed rolls, and a power-transmitting connection between said drive shaft and said cutting mechanism whereby the latter is operated in definitely timed periods with respect to the former.

15. In a machine of the character described, the combination with mechanism for corrugating a continuous web and applying a liner web to one side thereof, of measuring feed rolls driven independently of said mechanism for supplying a second liner web to the other side of said corrugated web, a power shaft driven independently of said mechanism, power-transmitting connections between said power shaft and said cutting mechanism, other power-transmitting connections between said power shaft and said measuring feed rolls, and means driven by said power shaft for controlling the periodicity of said cutting mechanism.

16. In a machine of the character described, the combination with mechanism for cutting corrugated board into lengths, means for operating said cutting mechanism at periodic intervals, means for feeding corrugated board to said cutting mechanism, means for supplying single-faced corrugated board from a slack supply, measuring feed rolls for feeding a liner web to the unfaced side of said single-faced web, means for applying said liner web thereto, means for driving said measuring feed rolls at predetermined relative speed with respect to said corrugated board feeding means.

17. In a machine of the character described, the combination with mechanism for cutting corrugated board into lengths, a power shaft, periodic operating connections between said power shaft and said cutting mechanism, means for feeding corrugated board to said cutting mechanism, means for supplying single-faced corrugated board from a slack supply, measuring feed rolls for feeding a liner web to the unfaced side of said single-faced web, operating connections between said power shaft and said measuring feed rolls for limiting the supply of said liner web, means for applying the liner web to the single-faced corrugated web, and operating connections between said power shaft and the first-mentioned feeding means whereby the latter are driven at predetermined faster speed than the measuring feed rolls.

18. In a machine of the character described, the combination with mechanism for cutting corrugated board into lengths, a power shaft, operating connections between said power shaft and said cutting mechanism for operating the latter at periodic intervals, upper and lower friction feed belts for feeding corrugated board to said cutting mechanism, mechanism for supplying single-faced corrugated board with slack portions therein to said friction feed belts, measuring feed rolls for feeding a liner web to the unfaced side of said single-faced web, operating connections between said power shaft and said measuring feed rolls, and operating connections between said power shaft and friction feed belts.

19. In a machine of the character described, the combination with mechanism for cutting corrugated board into lengths, a power shaft, operating connections between said power shaft and said cutting mechanism for operating the latter at periodic intervals, upper and lower friction feed belts for feeding corrugated board to said cutting mechanism, mechanism for forming single-faced corrugated board and supplying it under slack to said friction feed belts, measuring feed rolls for feeding a liner web to the unfaced side of said single-faced web, operating connections between said power shaft and said measuring feed rolls for driving the latter at predetermined relative speed with respect to said power shaft, and operating connections between said power shaft and friction feed belts whereby the latter are driven at predetermined faster speed than the measuring feed rolls.

20. The combination with a machine for making double-faced corrugated board and cutting it into lengths, said machine being provided with periodically-operated cutting mechanism and power connections for driving said cutting mechanism, means operated by and in definitely timed relation to said power connections for controlling the operation of said cutting mechanism independently of the movement of the double-faced corrugated board, and measuring feed rolls operating upon only one of the webs comprising said double-faced corrugated board, said measuring feed rolls being positively geared to said power connections for measuring the feed of the corrugated board by the periodicity of said cutting mechanism.

21. The combination with mechanism for supplying a corrugated web having a liner web applied to one face thereof, of measuring feed rolls operating upon a second liner web, mechanism for receiving the combined corrugated and first-mentioned liner web from the first-mentioned mechanism and for applying the second-mentioned liner web to the other face of said corrugated web, said mechanisms being operated at suitable relative speeds to provide a slack supply of the combined corrugated and first-mentioned liner webs between said mechanisms, periodically-operated cutting mechanism for the double-faced corrugated board, and means operated by and in definitely timed relation to said periodically-operated cutting mechanism for driving said measuring feed rolls, the second-mentioned mechanism including frictional driving means operating upon said double-faced corrugated board at slight over-feed with respect to said measuring feed rolls.

22. The combination with mechanism for applying a liner web to one face of a corrugated web of measuring feed rolls operating upon a second liner web, mechanism for receiving the combined corrugated and first-mentioned liner web from the first-mentioned mechanism and for applying the second-mentioned liner web to the other face of said corrugated web, said mechanisms being operated at suitable relative speeds to provide a slack supply of the combined corrugated and first-mentioned liner webs between said mechanisms, periodically-operated cutting mechanism for the double-faced corrugated board, and means operated by and in definitely timed relation to said periodically-operated cutting mechanism for driving said measuring feed rolls, the second-mentioned mechanism including frictional driving means operating upon said double-faced corrugated board at slight over-feed with respect to said measuring feed rolls.

GEORGE W. SWIFT, Jr.